United States Patent
Jain et al.

(10) Patent No.: US 9,164,558 B2
(45) Date of Patent: Oct. 20, 2015

(54) AUTOMATIC CLASSIFICATION CHANGE IN POWER OVER ETHERNET DEVICE

(71) Applicant: Cisco Technology, Inc., San Jose, CA (US)

(72) Inventors: Vipul Jain, San Jose, CA (US); James Molenda, Los Gatos, CA (US)

(73) Assignee: Cisco Technology, Inc., San Jose, CA (US)

(*) Notice: Subject to any disclaimer, the term of this patent is extended or adjusted under 35 U.S.C. 154(b) by 259 days.

(21) Appl. No.: 13/767,536

(22) Filed: Feb. 14, 2013

(65) Prior Publication Data

US 2014/0229747 A1 Aug. 14, 2014

(51) Int. Cl.
G06F 1/26 (2006.01)
H04L 12/40 (2006.01)
H04L 12/413 (2006.01)

(52) U.S. Cl.
CPC ............ G06F 1/26 (2013.01); H04L 12/40045 (2013.01); H04L 12/413 (2013.01)

(58) Field of Classification Search
CPC ................................ G06F 1/266; H04L 12/10
USPC ........................................................ 713/300
See application file for complete search history.

(56) References Cited

U.S. PATENT DOCUMENTS

| | | | |
|---|---|---|---|
| 6,650,622 B1 | 11/2003 | Austerman, III et al. | |
| 6,686,831 B2 | 2/2004 | Cook et al. | |
| 6,819,937 B2 | 11/2004 | Knuutila et al. | |
| 7,053,501 B1 | 5/2006 | Barrass | |
| 7,154,381 B2 | 12/2006 | Lang et al. | |
| 7,162,377 B2 | 1/2007 | Amrod et al. | |
| 7,203,849 B2 | 4/2007 | Dove | |
| 7,240,224 B1 | 7/2007 | Biederman | |
| 7,613,939 B2 | 11/2009 | Karam et al. | |
| 7,849,333 B2 | 12/2010 | Schindler | |
| 7,921,307 B2 | 4/2011 | Karam et al. | |
| 2005/0085212 A1 | 4/2005 | Peker et al. | |
| 2006/0047880 A1 | 3/2006 | Lindblom et al. | |
| 2006/0049818 A1 | 3/2006 | Montgomery | |
| 2006/0164098 A1 | 7/2006 | Su | |
| 2006/0164769 A1 | 7/2006 | Stanford et al. | |
| 2008/0164884 A1 | 7/2008 | Hussain et al. | |
| 2009/0031151 A1 | 1/2009 | Masuda et al. | |
| 2009/0327766 A1 | 12/2009 | Ghoshal et al. | |

OTHER PUBLICATIONS

International Search Report and Written Opinion, from PCT Application No. PCT/US2014/013132, Mar. 28, 2014, WO.
"IEEE 802.3at High Power PD Interface Controller with 2-Event Classification Recognition", Linear Technology, LTC4265, accessed Nov. 28, 2012.
"Cisco Virtualization Experience Client 2100 and 2200 Series", Cisco, accessed Dec. 5, 2012.
International Preliminary Report on Patentability, from PCT/US2014/013132, Aug. 27, 2015, WO.

*Primary Examiner* — Albert Wang
(74) *Attorney, Agent, or Firm* — Lempia Summerfield Katz LLC (57) ABSTRACT

In one implementation, a classification resistance of a powered device is adjusted passively. The powered device is configured to receive a classification voltage from a network device and, in response, is configured to send a first current indicative of a first classification resistor to the network device. The first current and first classification resistor indicate a power requirement when no accessories are connected to the powered device. When at least one accessory is connected to the powered device, the powered device is configured to send a second current indicative of a second classification resistor to the network device. The second classification resistor is isolated from other circuitry of the at least one accessory. The second classification resistor may be located in the powered device, the accessory, or a connector coupled to the powered device and the accessory.

18 Claims, 11 Drawing Sheets

AUTOMATIC CLASSIFICATION CHANGE IN POWER OVER ETHERNET DEVICE

TECHNICAL FIELD

This disclosure relates in general to the field of power over Ethernet and, more particularly, endpoint classification in power over Ethernet.

BACKGROUND

Power over Ethernet technology provides algorithms for delivering power on cables traditionally designated for data only. Power over Ethernet enabled devices may require only one cable to be connected to the device, which simplifies building wiring designs and may enable better placement of devices.

One of the challenges for power over Ethernet technology is to allocate power for the capabilities of the device based on the amount of power needed. Various power over Ethernet devices require different amounts of power. Power sourcing equipment can more efficiently allocate and supply power to various power over Ethernet devices if the power requirements of the power over Ethernet devices are known. The power source equipment provisions power resources according to power classifications of the power over Ethernet devices. The classification of power over Ethernet devices are typically determined at manufacture of the power over Ethernet devices. However, the power over Ethernet device may subsequently desire to operate with different (higher) power requirements depending on mode or attached accessories.

BRIEF DESCRIPTION OF THE DRAWINGS

Exemplary embodiments of the present embodiments are described herein with reference to the following drawings.

DESCRIPTION OF EXAMPLE EMBODIMENTS

Overview

In one example, a powered device receives a classification voltage from a network device, and sends a first current indicative of a first classification resistance to the network device when no accessories are connected to the powered device and sends a second current indicative of a second classification resistance to the network device when at least one accessory is connected to the powered device. The first classification resistance is not responsive to and the second classification resistance is responsive to a second classification resistor, and the second classification resistor is isolated from circuitry of the at least one accessory.

In another example, an apparatus includes a classification circuit and an accessory connector. The classification circuit is configured to receive a classification voltage from a network device and send a first current responsive to a first classification resistance to the network device when no accessories are connected to the apparatus, and the accessory connector is configured to couple the apparatus to an accessory. The classification circuit is configured to send a second current responsive to a second classification resistance to the network device when at least the accessory is connected to the apparatus, the second classification resistance is responsive to a second classification resistor, and the accessory connector and the accessory are free from switchable connections coupled to the second classification resistor.

In another example, an apparatus includes a first connector, a second connector, a data path from the first connector to the second connector, and a classification path from the first connector to the second connector. The first connector configured to be electrically coupled to a powered device, and the second connector configured to be electrically coupled to an accessory. The data path is configured to communicate data indicative of functions of the accessory to the powered device, and the classification path is electrically isolated from the data path.

Example Embodiments

Power over Ethernet (PoE) is defined in the IEEE (Institute of Electrical and Electronics Engineers, Inc.) Standard 802.3af, published Jun. 18, 2003 and entitled "IEEE Standard for Information technology—Telecommunications and information exchange between systems—Local and metropolitan area networks—Specific requirements, Part 3: Carrier Sense Multiple Access with Collision Detection (CSMA/CD) Access Method and Physical Layer Specifications, Amendment: Data Terminal Equipment (DTE) Power via Media Dependent Interface (MDI)" and in IEEE Standard 802.3 at, published Sep. 11, 2009 and entitled "802.3 at Amendment 3: Data Terminal Equipment (DTE) Power via the Media Dependent Interface (MDI) Enhancements." The IEEE 802.3af/at standards combine the transmission and reception of Ethernet packets with the transmission and reception of DC-based power over the same set of wires (e.g., category 5 twisted pair) in a single Ethernet cable. Other standards, such as later developed replacement or similar types of standards may be used.

In accordance with the 802.3af/at standards, a power sourcing equipment (PSE) carries out an inline discovery process, and if successful, an inline power classification process. The discovery process is performed to detect the presence of a powered device (PD) at a network port prior to sending power to the PD through the network port and to prevent sending power and causing damage to devices that are non-compliant with the PoE standard. The classification process set forth in 802.3af/at involves applying a voltage in a classification range to the PD. The PD may use a current source to send a predetermined classification current signal back to the PSE. This classification current signal corresponds to the class of the PD. Under the current 802.3af/at standard, the PD is classified as a member of one of a set of five classes. While the 802.3af/at standard calls for delivery of different wattages, powered devices are often allocated more power than the powered devices need.

The PSE allocates power according to the need of the powered devices. The PSE has a power supply rated at a predetermined power level. The power that can be delivered by the power supply is divided among the Ethernet ports of the PSE, which are connected to various PDs and other endpoints. The other endpoints do not require any operating power under the 802.3af/at standards and some PDs require less power than other PDs. In order to efficiently reserve and allocate power among the various ports, the PSE is aware of the possible power requirements of connected devices.

The classification process provides the PSE with this information. Some PDs require different amounts of power at different operation modes or when different accessories are connected. One solution to deal with this phenomenon may be to allocate maximum possible power to PDs with varying power requirements, such as allocating the power based on the classification of the PD where the classification is set by the manufacturer to handle the worst case—maximum power usage. However, some PDs never or rarely require the higher amounts of power, which results in inefficient allocation of power by the PSE. Inevitably, some power goes unused. The following embodiments provide automatic and dynamic classification of a PD depending on whether one or more accessories are coupled to the PD.

Figure 1:
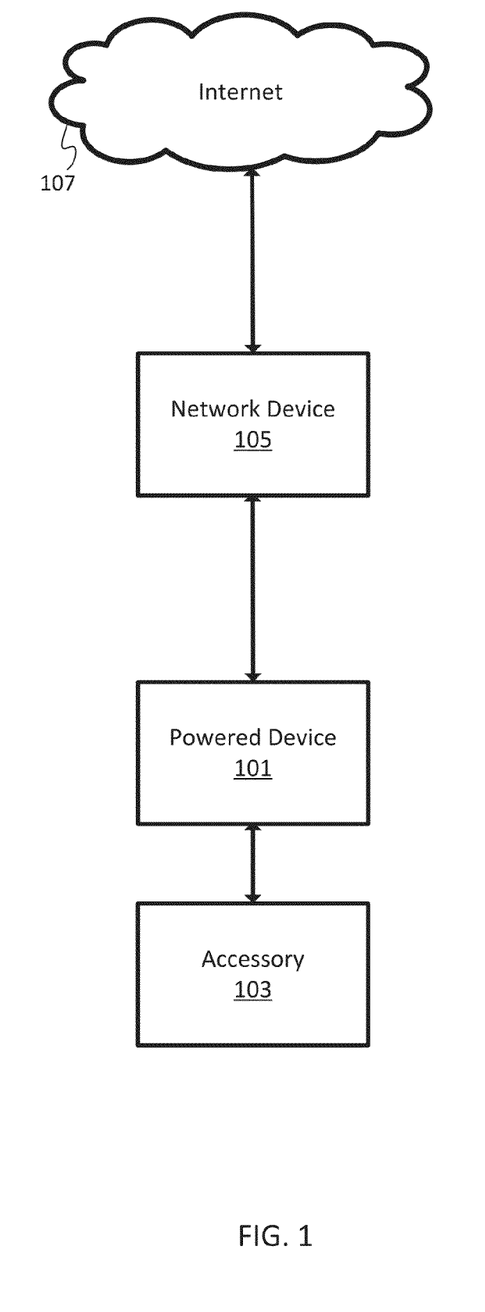
FIG. 1 illustrates an example network automatic classification change in power over Ethernet.

FIG. 1 illustrates a system with an example network automatic classification change in power over Ethernet. The network device 105 is coupled to the Internet 107 and a powered device 101. The network device 105 may be a power sourcing equipment (PSE). The powered device 101 may be coupled to an accessory 103 directly or by way of a connector or other intervening component.

The network device 105 may be configured to communicate with the powered device 101 in a discovery phase and a classification phase. In the discovery phase, the network device 105 interrogates the powered device 101 in order to identify the powered device 101 as compatible. For example, the network device 105 may generate multiple interrogation voltages (e.g., a voltage ramp from 2.5 to 10 V) to detect an impedance of the powered device 101. If the impendence is within a predetermined range, such as 19.6 kilohms to 26.5 kilohms (e.g., 24.9 kilohms), the network device 105 identifies the powered device 101 as a PoE device. If the impedance is not with the predetermined range, the network device 105 may cease communication with the powered device 101 or cease sending operational power to the powered device 101 and communicate using data only under the Ethernet standard. Other discovery measures may be used.

For a PoE device, the network device 105 begins the classification phase. The network device 105 generates a classification voltage. The network device 105 may generate the classification voltage based on identification of the powered device 101 as a PoE device or other trigger. The classification voltage may be greater than the interrogation voltage. For example, the classification voltage may be within a second predetermined range, such as 14.5 V to 20.5 V.

The powered device 101 is configured to receive the classification voltage from the network device 101. The powered device 101 is configured to generate a classification current in response to the classification voltage received from the network device 101. The classification current is based on a classification resistor in the powered device 101. When no accessory is connected to the powered device 101, the powered device 101 is configured to send a low current indicative of the classification resistor to the network device 101.

When an accessory is attached to the powered device 101, an accessory resistor is connected in parallel with the classification resistor. The powered device 101 is configured to send a higher current indicative of the accessory resistor or a total resistance based on a combination of the classification resistor and the accessory resistor. The relationship between the current and the total resistance may be linear. The accessory resistor, which may be referred to as a second classification resistor, is isolated from the other circuitry of the accessory 103. For example, the accessory 103 may include an accessory circuit for providing a display and phone line and status information to the user. The accessory resistor is not electrically connected to the accessory circuit. The accessory resistor is dedicated to classification and has no other purpose, so is isolated from other electrical devices of the accessory 103.

The powered device 101 may also be configured to respond to an undervoltage lockout phase. The network device 105 may be configured to generate a third predetermined range of voltages to deliver to the powered device 101 higher than the second predetermined range used for the classification phase. The network device 105 may increase the voltage until the powered device 101 reaches an operating threshold, which triggers the powered device 101 to leave initialization operation and enter normal operation for the functions of the accessory 103.

Figure 2:
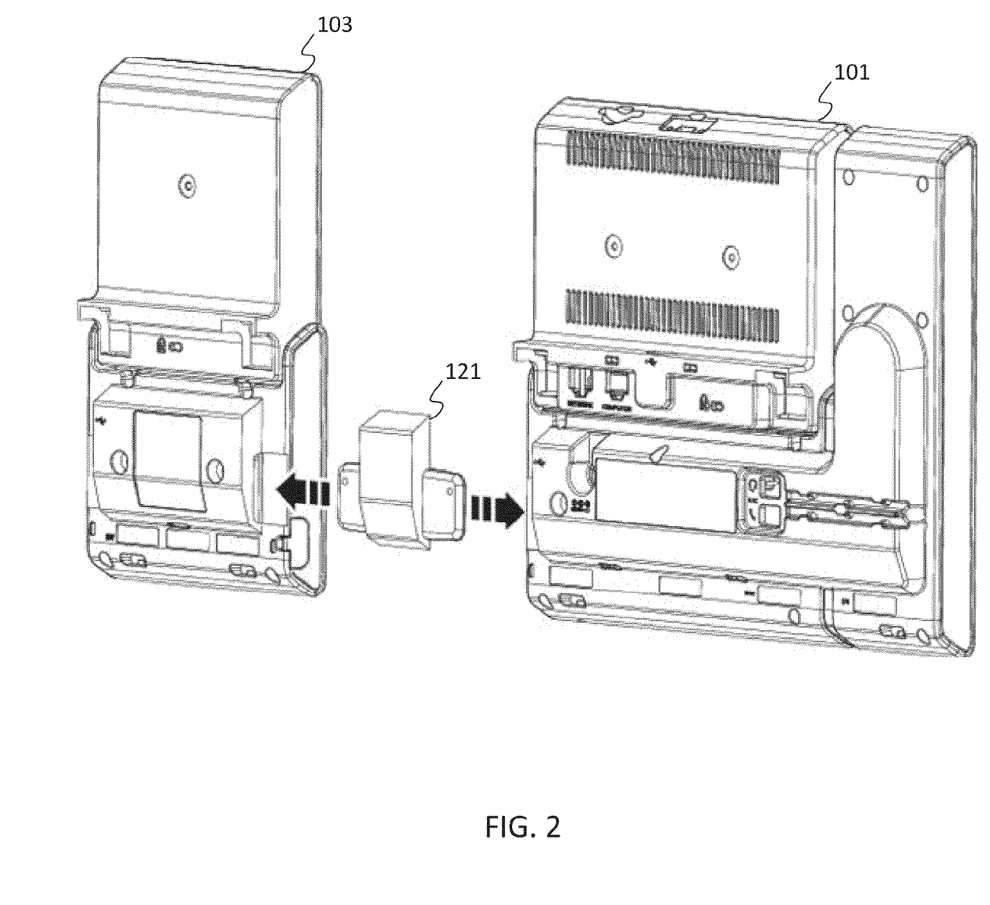
FIG. 2 illustrates example devices coupled to the network of FIG. 1.

FIG. 2 illustrates example devices coupled to the network of FIG. 1. The devices include the powered device 101, a connector 121, and the accessory 103. Additional, different, or fewer components may be provided. For example, the accessory 103 connects directly to the powered device 101 without the connector 121.

The powered device 101 may be an IP phone. The IP phone is configured to encode, decode, send, and receive data packets according to voice over Internet protocol (VoIP) protocols. These VoIP networks allow the IP telephones to send and receive audio, video, data, and other signals as Internet protocol signals. The IP phone includes a display and multiple user inputs for sending and receiving phone calls. The IP phone may include inputs for individual phone lines. An example IP phone may be models 7960 and 7970 series IP phones, as well as Cisco Unified IP Phones 9971, 9951, and 8961 IP phone models manufactured by Cisco Systems, Inc. of San Jose, Calif.

The accessory 103 may be a key expansion module (KEM) for the IP phone. The KEM expands the functionality of the IP phone. The KEM may add an additional display and user inputs for adding phone lines to the IP phone. The user inputs may be line keys arranged next to associated portions of the display. The keys may be programmable as a directory number, line key, or speed dial key. The keys may be configured to be illuminated. An accessory such as the KEM may add other functionality to the IP phone such as speaker phone, recording capabilities, a touchscreen interface, a phone directory, or an Internet browser. An example KEM includes Cisco IP Phone Expansion Module 7914 that includes additional programmable buttons and displays. Other accessories may be used instead or in addition.

The connector 121 may be a spine connector for a KEM. The spine connector may include contacts on one end configured to couple to the IP phone and contacts on the other end configured to couple to the KEM. The spine connector may include a power contact, a ground contact, at least two data contacts, and at least one classification contact. The classification contact is electrically connected to the second classification resistor and not connected to the power contact, the ground contact, and/or the at least two data contacts. The accessory device 103 may be the spine connector or the combination of the accessory and the spine connector.

The spine connector may be configured to connect a first KEM to a second KEM. Any number of KEMs may be connected in series to the IP phone. However, the number of KEMs connected to a single IP phone may be limited to the power requirements of the KEMs and the power available under the PoE standard or available from the PSE. The spine connector may be a tethered spine connector cable configured to connect the KEM and the IP phone, or multiple KEMs, at a distance, without requiring they be physical adjoined.

Figure 3:
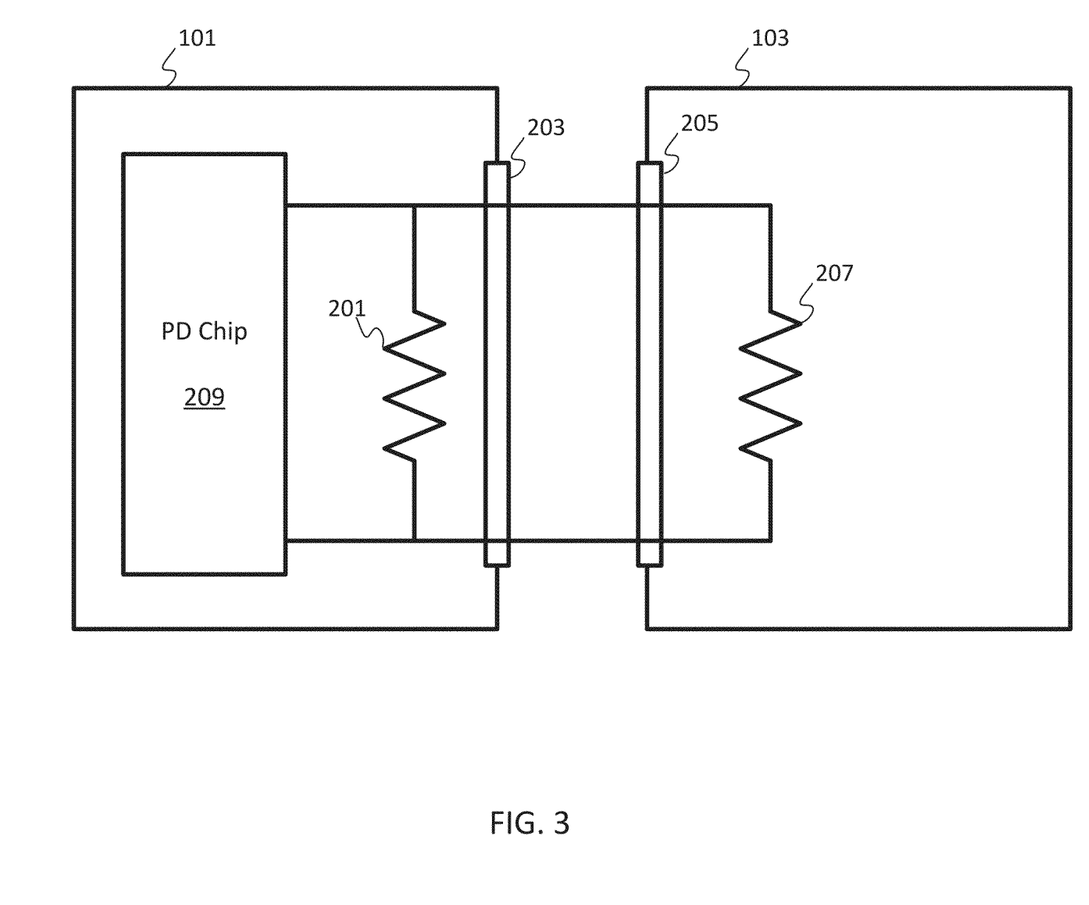
FIG. 3 illustrates an example powered device for automatic classification change in power over Ethernet.

FIG. 3 illustrates an example powered device 101 for automatic classification change in power over Ethernet. The powered device 101 includes a first classification resistor 101, a powered device (PD) chip 209, and a PD communication interface 203. The PD communication interface 203 is an example of an accessory connector configured to couple the apparatus to the accessory device 103. The powered device 101 is coupled to an accessory device 103. The accessory device 103 includes a second classification resistor 207 and an accessory communication interface 205.

The powered device 101 may be an IP phone, a security camera, a web camera, an intercom speaker, an intercom microphone, a wall clock, a wireless access point, a sensor, an electronic lock, a fire detector and/or alarm, or another device. The accessory device 103 may be an expansion module for the powered device 101. The accessory device 103 may be a different type or the same type of device as the powered device 101. For example, multiple powered devices may be daisy chained or tethered together in series. The expansion module may include one or more of a display, a microphone, a camera, a speaker, and an input device. The accessory device 103 may be a virtual desktop interface terminal, which may provide a zero client or a thin client capability.

The powered device 101 requires one of different amounts of power depending on how the powered device 101 is classified. Table 1 lists five possible classifications, but any number of classifications is possible. Each classification is associated with a maximum power level for operation of the powered device 101. In addition, each classification is associated with a classification current or a classification resistance for the classification process. Table 1 lists example classification resistances.

TABLE 1

| Classification | Power | Resistance |
| --- | --- | --- |
| 0 | 12.95 watts | Infinite (open circuit) |
| 1 | 3.84 watts | 123 ohms |
| 2 | 6.49 watts | 69.8 ohms |
| 3 | 12.95 watts | 45.3 ohms |
| 4 | 12.95 watts | 30.9 ohms |

The powered device 101 also requires different amounts of power depending on whether any accessory is connected to the powered device 101 or depending on how many accessories are connected. Connecting an accessory to the powered device 101 may cause the powered device 101 to change class. Table 2 lists possible classification resistors that may be added in parallel to the current classification resistance of the powered device to change the classification of the powered device 101. For example, if the accessory would change the powered device 101 from class 1 to class 2, the added classification resistor may be 159.7 ohms. As another example, if the accessory would change the powered device 101 from class 1 to class 3, the added classification resistor may be 71.4 ohms.

TABLE 2

| First Classification | Second Classification | Resistance |
| --- | --- | --- |
| 1 | 2 | 159.7 ohms |
| 1 | 3 | 71.4 ohms |
| 1 | 4 | 41.2 ohms |
| 2 | 3 | 129.1 ohms |
| 2 | 4 | 55.4 ohms |
| 3 | 4 | 97.2 ohms |

The powered device 101 is configured to send a first classification current to the network device 105 when the accessory device 103 is not connected and a second classification current to the network device 105 when the accessory is connected. The powered device may be configured to force a re-classification process once the accessory has been attached. This re-classification could be user induced or could be induced by active components contained within the powered device 101. With respect to the classification process, the accessory device 103 includes only a resistor. The accessory device 103 includes no switchable connection coupled to the resistor. Switchable connections may include on/off switches tied to whether the accessory 103 is turned on or transistors connected to the resistor that are configured to open an electrical path to the resistor. The communication interface 203 (accessory connector) and the accessory device 103 are free from any switchable connections coupled to the second classification resistor 207. No active circuit components connect with the resistor.

The accessory device 103 may include a functional path that electrically connects the accessory device 103 to the powered device 101 for the purpose of operating the accessory device 103. For example, the functional path may include a power connection for powering the accessory device 103, and the functional path may include a data connection for exchanging information between the accessory device 103 and the powered device 101. The exchanged information may be data indicative of VoIP connections. The accessory device 103 also includes a classification path electrically connected to the second classification resistor. The classification path is electrically isolated from the functional path. Accordingly, the classification resistor 207 is electrically isolated from the functional path. The classification resistor 207 is floating with respect to other circuitry of the accessory device 103.

The PD chip 209 of the powered device 101 may include a discovery and classification circuit including but not limited to active elements comprising a current source, an operational amplifier, and a metal oxide semiconductor field-effect transistor (MOSFET). The active circuit may be configured to generate the classification current based on the classification resistances and send the classification current to the network device 105. Based on the classification resistances, the PD chip 209 is configured to generate a first current indicative of power requirements for the powered device without the accessory device 103 and a second current indicative of power requirements for the powered device in combination with the accessory device 103.

Figure 4:
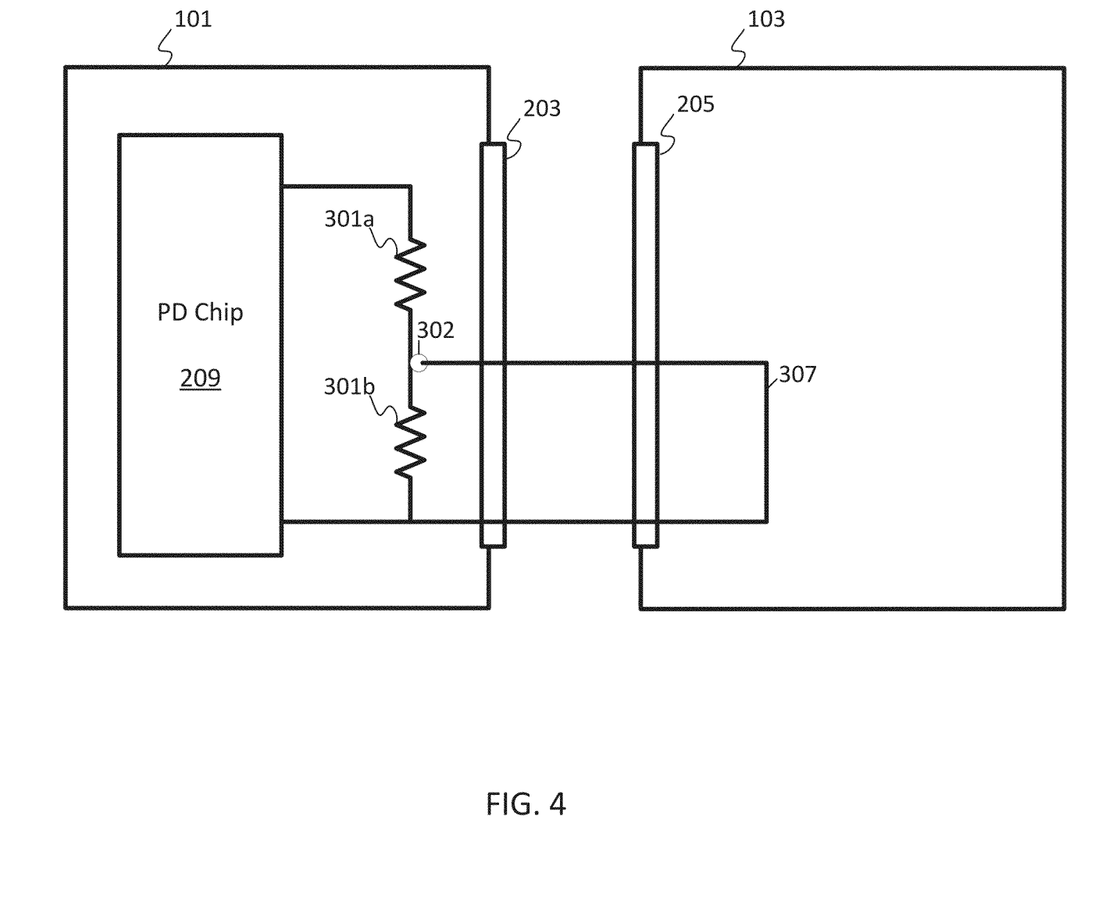
FIG. 4 illustrates another example powered device for automatic classification change in power over Ethernet.

FIG. 4 illustrates another example powered device for automatic classification change in power over Ethernet. FIG. 4 illustrates the powered device 101 including PD chip 209 coupled to the accessory device 103 by way of communication interfaces 203 and 205. The powered device 101 includes a primary resistor 301*a* and a secondary resistor 301*b*. Initially, the classification resistance of the powered device 101 is provided by the primary resistor 301*a* and the secondary resistor 301*b* in series. The sum of the two resistances is indicative of the powered device 101 with no accessories.

When the accessory device 103 is coupled to the powered device, a classification shunt 307 is introduced into the classification circuit. The classification shunt 307 provides a short circuit around the secondary resistor 301*b*. When the accessory device 103 is coupled to the powered device 101, the classification resistance of the powered device 101 includes only the primary resistor 301*a*. Examples include 69.8 ohms for the primary resistor 301*a* and 53.2 ohms for the secondary resistor 301*b*, which corresponds to classifications 1 and 2 in Table 1. The shunt 307, like the resistor example in FIG. 3, is isolated and provided in the accessory only for classification purposes.

The classification shunt 307 may also break the connection between the primary resistor 301*a* and the secondary resistor 301*b* at point 302. The classification shunt 307 may engage a resistor network including the primary resistor 301*a* and the secondary resistor 301*b* in the powered device through a mechanical connection.

Figure 5:
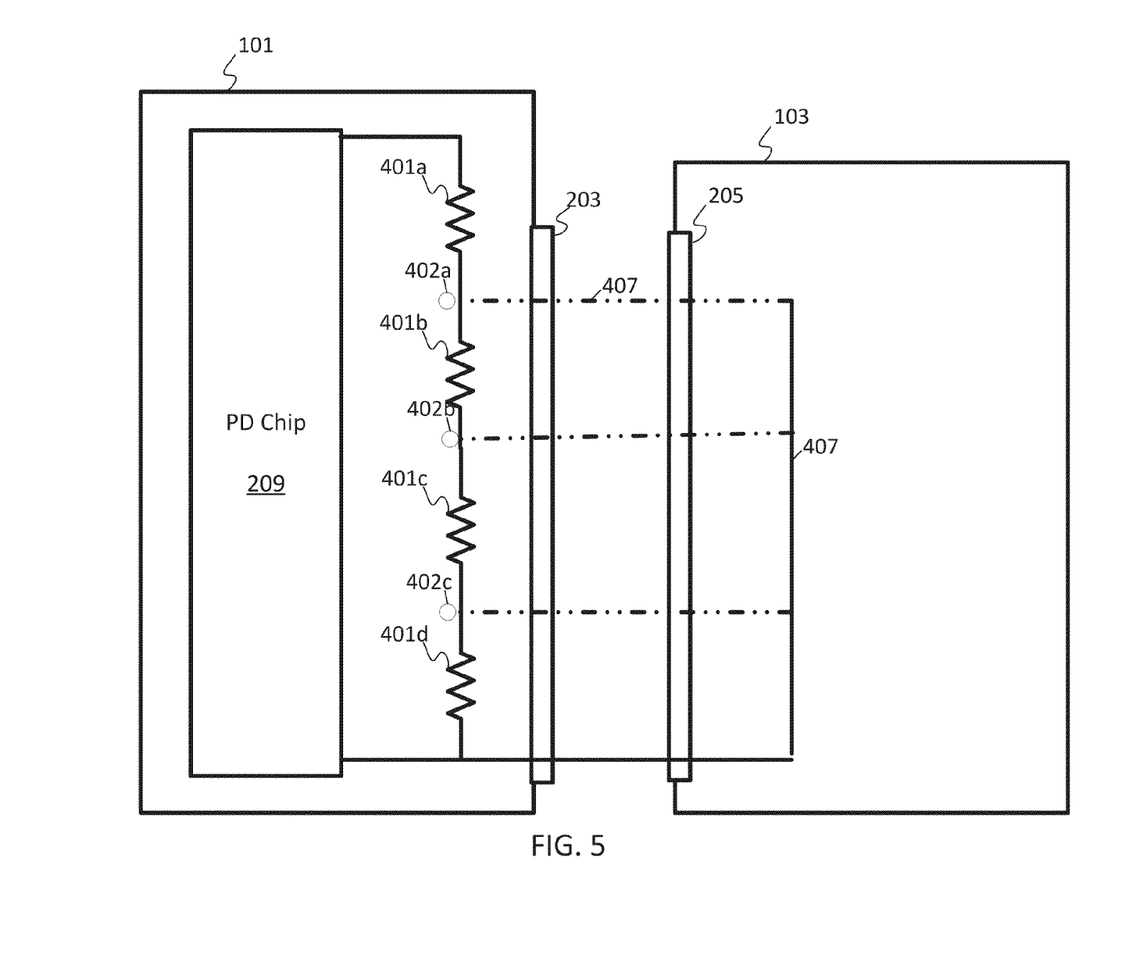
FIG. 5 illustrates yet another example powered device for automatic classification change in power over Ethernet.

FIG. 5 illustrates another example powered device for automatic classification change in power over Ethernet. FIG. 5 illustrates the powered device 101 including PD chip 209 coupled to the accessory device 103 by way of communication interfaces 203 and 205. The powered device 101 includes a resistor network comprising resistors 401*a-d* in series.

When the accessory device 103 is coupled to the powered device, a classification shunt 407 is introduced into the resistor network. The classification shunt 407 provides a short circuit around one or more of the resistors in the resistor network. When no accessory device is coupled to the powered device 101, the classification resistance may be the sum of all four resistors 401*a-d*. When the accessory device 103 is coupled to the powered device 101, the classification resistance is changed according to where the classification shunt 407 is coupled to the resistor network. Each of points 402*-c* may connect to the classification shunt 407 to provide a different classification resistance. The classification shunt 407 may engage the resistor network through a mechanical connection or create a new connection to the PD chip 209. The classification shunt 407 may be implemented on the accessory device 103 or on a spine connector.

Figure 6:
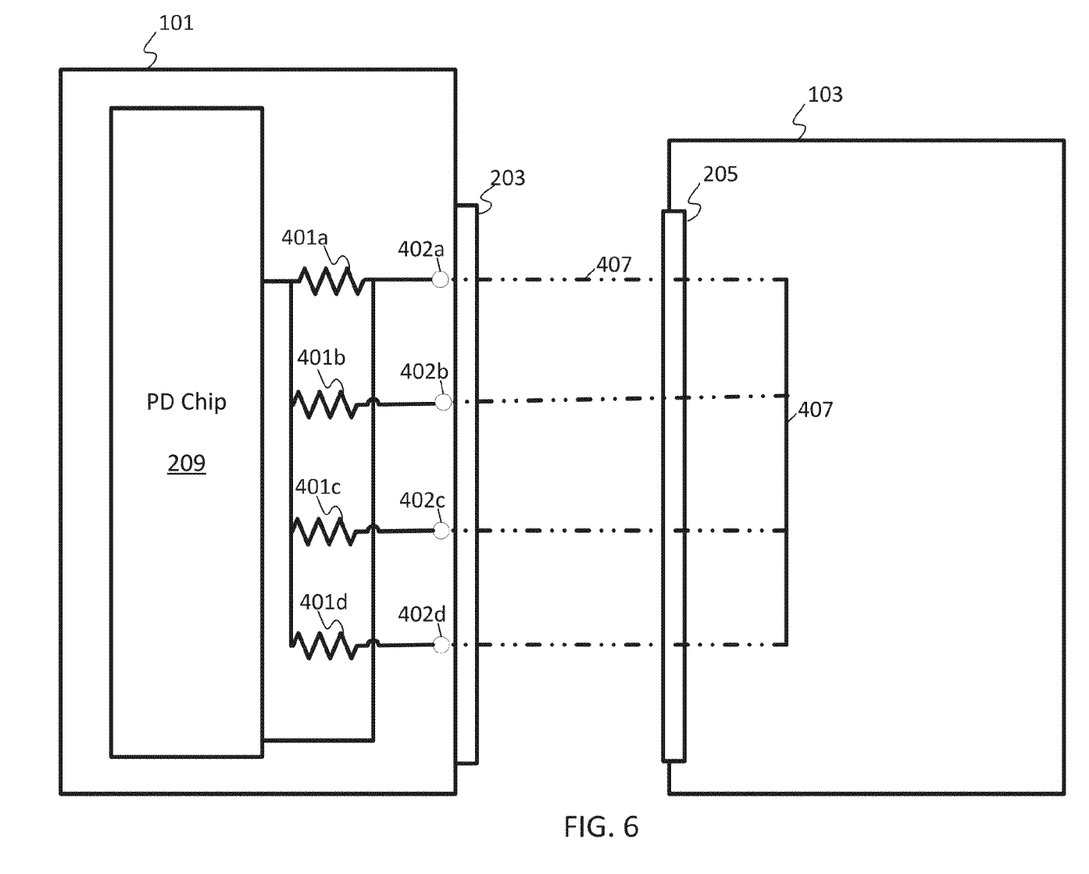
FIG. 6 illustrates yet another example powered device for automatic classification change in power over Ethernet.

FIG. 6 illustrates yet another example powered device for automatic classification change in power over Ethernet. FIG. 6 illustrates the powered device 101 including PD chip 209 coupled to the accessory device 103 by way of communication interfaces 203 and 205. The powered device 101 includes a resistor network comprising resistors 401*a-d* such that the resistors 401*a-d* may be placed in parallel, depending upon the configuration of shunt circuit as explained below. When the accessory device 103 or a spine connector is coupled to the powered device, a classification shunt 407 is introduced into the resistor network. The classification shunt 407 connects one or more of the resistors 401*b-c* in parallel with resistor 401*a*. For example, the classification shunt 407 provides a short circuit to connect one or more of the resistors in parallel. When no accessory device 103 or spine connector is coupled to the powered device 101, the total classification resistance is resistor 401*a*. When the accessory device 103 or spine connector is coupled to the powered device 101, the classification resistance is changed according to where the classification shunt 407 is coupled to the resistor network. Each of the points 402*b-d* may connect to the classification shunt 407 to provide a different classification resistance. In the examples shown in FIGS. 5 and 6, the accessory device 103 or the spine connector contain conductive traces only. All resistors are internal to the powered device 101.

Figure 7:
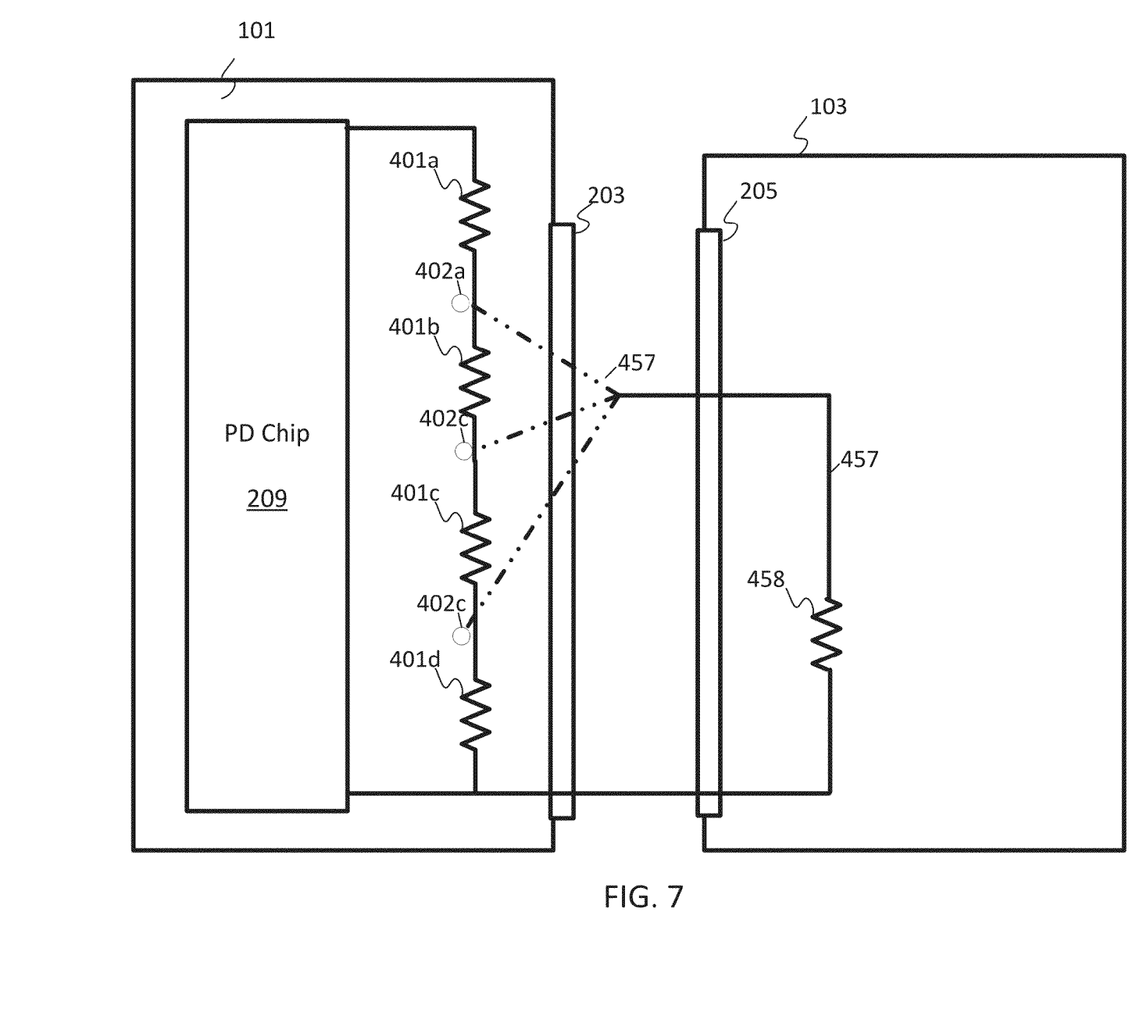
FIG. 7 illustrates another example powered device for automatic classification change in power over Ethernet.

FIG. 7 illustrates another example powered device for automatic classification change in power over Ethernet. In the alternative of FIG. 7, the accessory device 103 may introduce a resistor in parallel to different locations in the resistor network. For example, a resistor 458 may be included in classification device 457. When no accessory device is coupled to the powered device 101, the classification resistance may be the sum of all four resistors 401*a-d*. When the accessory device 103 is coupled to the powered device 101, the classification resistance is changed according to where the classification device 457 including the resistor 458 in parallel is coupled to the resistor network. Each of points 402*-c* may connect to the classification device 457 to provide a different classification resistance.

The dashed lines are shown to indicate the possible connections. A given shunt of the accessory device 103 is dedicated to one of the possible connections. A switch is not provided in the accessory device 103 to control where to connect the shunt. The various points 402 are usable by different accessory devices 103, such that an accessory device 103 needing more power shunts to one point 402 and an accessory device 103 needing less power shunts to a different point 402. Alternatively, a switch in the powered device 101 selects where the shunt connects.

Figure 8:
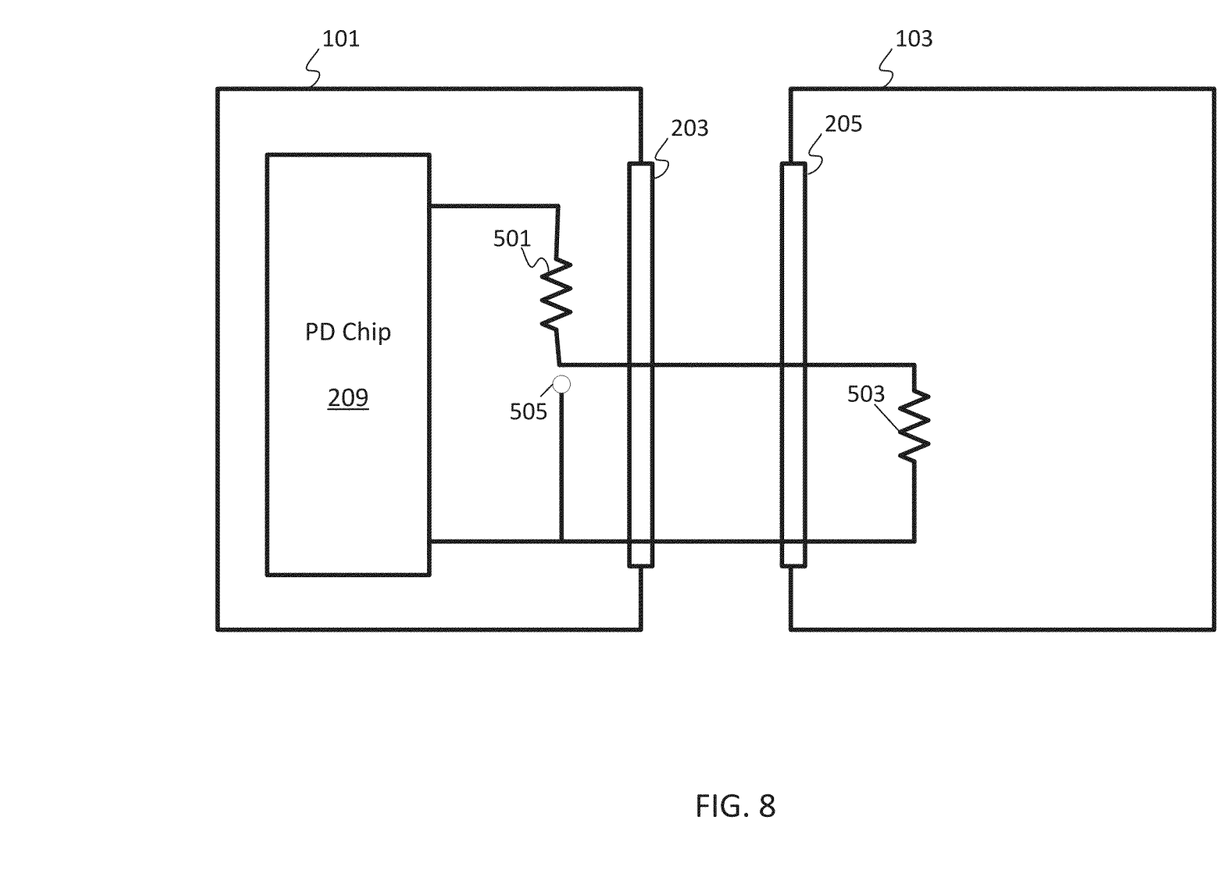
FIG. 8 illustrates another example powered device for automatic classification change in power over Ethernet.

FIG. 8 illustrates another example powered device for automatic classification change in power over Ethernet. FIG. 8 illustrates the powered device 101 including PD chip 209 coupled to the accessory device 103 by way of communication interfaces 203 and 205. The powered device 101 includes a primary resistor 501 and the accessory device 103 includes a secondary resistor 503. Initially or without connection of the accessory device 103, the classification resistance of the powered device 101 is provided by the primary resistor 501. When the accessory device 103 is coupled to the powered device 101, the classification resistance is provided by the primary resistor 501 and the secondary resistor 503 in series. The accessory device 103 is also configured to mechanically break the connection between the primary resistor 501 and the PD chip 209 in order to create a new classification path including the primary resistor 501 and the secondary resistor 503.

It is noted that the secondary resistor 503 increases the total resistance seen by the PD chip 209. Under the 802.3af/at standard, the increase in total resistance would classify the powered device 101 into a lower class. However, other standards may specify increased classification resistances are associated with higher classes and higher power requirements.

Figure 9:
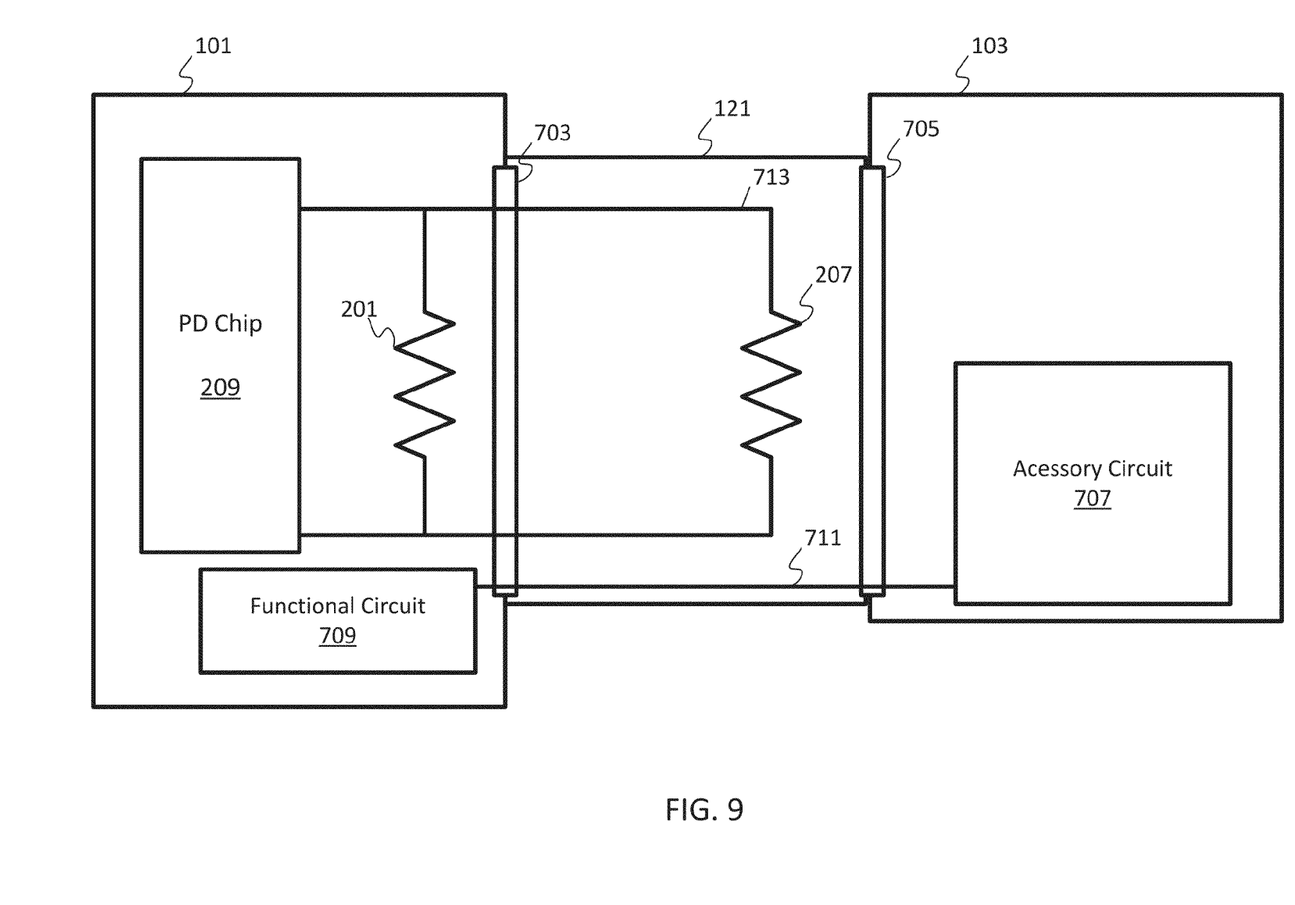
FIG. 9 illustrates still another example powered device for automatic classification change in power over Ethernet.

FIG. 9 illustrates yet another example powered device 101 for automatic classification change in power over Ethernet. The powered device 101 includes the PD chip 209 coupled to the accessory device 103 by way of the spine connector 121. In the example of FIG. 9, the spine connector 121 includes the second classification resistor 207. The accessory device 103 may include no elements in the classification circuit since the connector 121 is used instead. However, coupling the spine connector 121 to the accessory device 103 may activate the spine connector 121 to provide the second classification resistor 207 to the powered device 101. In alternative embodiments, the accessory device 103 includes the resistor 207 and the connector 121 connects the resistor 207 with the resistor 201.

The spine connector 121 includes a first connector 703 configured to be electrically coupled to the powered device

101, and a second connector 705 configured to be electrically coupled to the accessory device 103. A data path 711 extends from the first connector 203 to the second connector 205. The data path 711 connects the functional circuit 709 of the powered device to the accessory circuit 707 of the accessory device 103. The functional circuit 709 and the accessory circuit 707 interact to provide the functionality of the accessory. For example, the data path may carry user inputs from the accessory device 103 to the powered device 101 and return display information or phone line information from the powered device 101 to the accessory device.

The spine connector 121 includes a classification path 713 including the second classification resistor 207, extending from the first connector 703 to the second connector 705. The classification path 713, including the second classification resistor 207 may be electrically isolated from the data path 711, electrically isolated from the functional circuit 709, and/or electrically isolated from the accessory circuit 707.

The second classification resistor 207 in the classification path 713 is an example of an accessory classification resistance configured to lower the powered device classification resistance when the first connector 703 is electrically coupled to the powered device 103. Alternatively, the classification resistor 207 may not be included the spine connector 121 but instead a shunt is provided to adjust the classification resistance of the powered device 101 as described in the above embodiments such that the classification path includes a connection configured to lower the powered device classification resistance when the first connector 703 is electrically coupled to the powered device 101.

Multiple accessory devices may be coupled to the powered device 101. For example, a second spine connector may couple the first accessory 103 to a second accessory. Each of the spine connectors may include an additional resistor. When the accessory devices are connected to one another, the additional resistors are connected in parallel and/or serially to the classification resistor.

Figure 10:
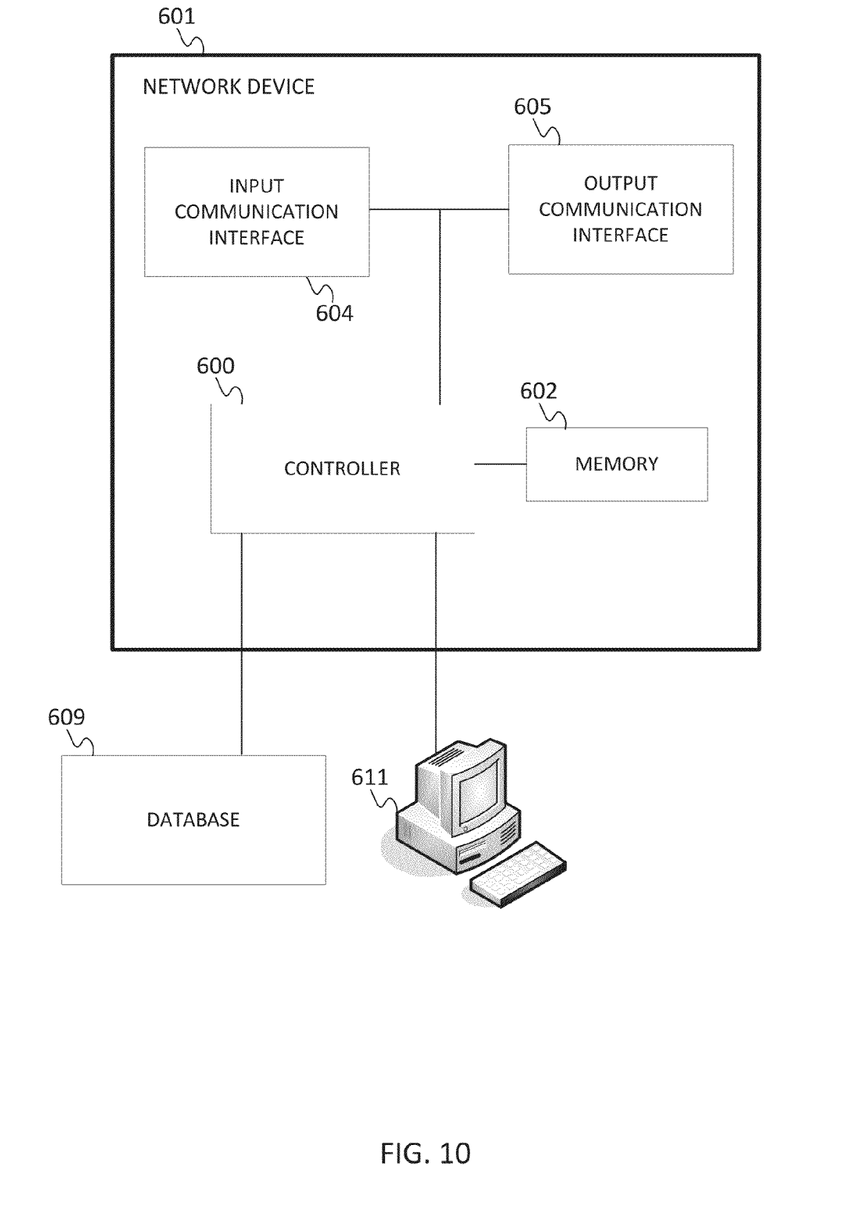
FIG. 10 illustrates an example device of FIG. 1.

FIG. 10 illustrates an example device 601 of FIG. 1 configured for automatic classification change in power over Ethernet. The device 601 may implement the network device 105 or the PD chip 209 of the powered device 101. For example, the network device 601 may include an application specific integrated circuit (ASIC). Other devices than ASIC may be used, such as field programmable gate arrays, control processor, dedicate circuit, or general processors. The network device 601 includes at least a controller 600, a memory 602, an input communication interface 604, and an output communication interface 605. The network device 601 may also communicate with a workstation 611 and a database 609.

In the case of implementation of the network device 105, the controller 600 is configured to generate output signals according to a discovery phase, a classification phase, and an operation phase. In the discovery phase, the controller 600 generates a series of signal operable to identify power over Ethernet devices. In the classification phase, the controller 600 generates a series of signals to detect the impedance of an identified power over Ethernet devices. The impedance is indicative of a power classification of the identified power over Ethernet devices. Based on the power classifications, the controller 600 allocates power. The power classifications and power levels may be stored in database 609. In the operation phase, the controller 600 is configured to forward data packets and deliver power according to the power classification across a single cable or a single pair of wires. The input communication interface 304 may include one or more ingress ports. The input communication interface 304 is configured to receive a sequence of data packets from an upstream node.

The controller 600 of the network device 105 may also be configured to repeat the discovery and classification process to detect when a new accessory is attached. A rediscovery and reclassification process could be induced manually by the user by disconnecting the wire connecting the network device 105 to the powered device or it could be achieved using a relay or MOSFET based circuit inside the powered device 101.

In the case of implementation of the network powered device 101, the controller 600 is configured to receive a classification voltage from a network device and send a first current indicative of a first classification resistor to the network device when no accessories are connected to the apparatus. The controller is configured to send a different current indicative of a second classification resistor to the network device when at least one accessory is connected to the apparatus.

The controller 300 may include a general processor, digital signal processor, an application specific integrated circuit (ASIC), field programmable gate array (FPGA), analog circuit, digital circuit, combinations thereof, or other now known or later developed processor. The controller 300 may be a single device or combinations of devices, such as associated with a network, distributed processing, or cloud computing.

The memory 302 may be a volatile memory or a non-volatile memory. The memory 302 may include one or more of a read only memory (ROM), random access memory (RAM), a flash memory, an electronic erasable program read only memory (EEPROM), or other type of memory. The memory 302 may be removable from the network device 101, such as a secure digital (SD) memory card.

In addition to ingress ports and egress ports, the input communication interface 304 and the output communication interface 305 may include any operable connection. An operable connection may be one in which signals, physical communications, and/or logical communications may be sent and/or received. An operable connection may include a physical interface, an electrical interface, and/or a data interface.

Figure 11:
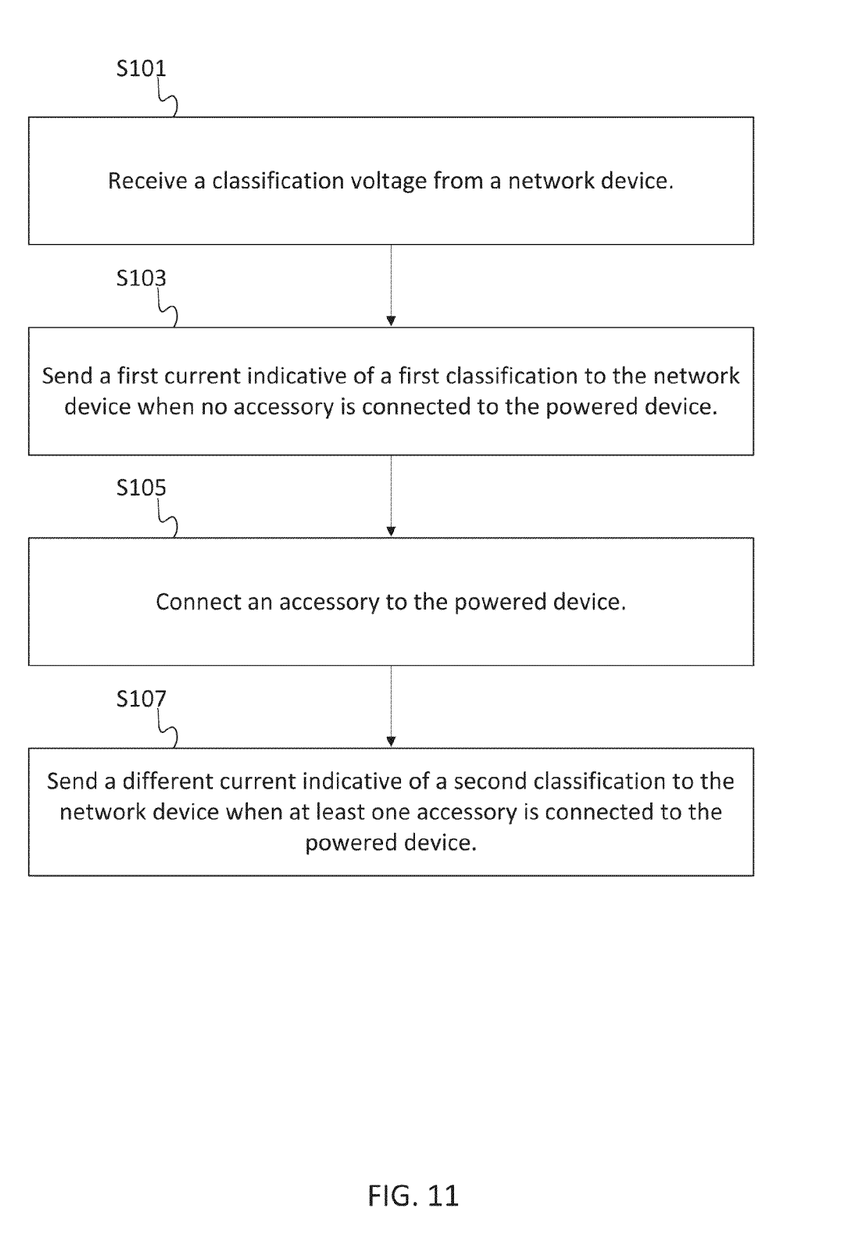
FIG. 11 illustrates an example flowchart for automatic classification changes in power over Ethernet.

FIG. 11 illustrates an example flowchart for automatic classification change in power over Ethernet. Additional, fewer or different acts may be included. The method of FIG. 11 includes, but may omit the initial discovery phase. In the discovery phase, the powered device receives an interrogation voltage from the network device and sends an interrogation signal from the powered device to the network device.

At act S101, which may be in response to the interrogation signal, the powered device receives a classification voltage from the network device. The classification voltage may be a series of voltages in a predetermined range. The powered device 101 includes an active or passive circuit configured to return currents indicative of the classification of the powered device.

The powered device may have a dynamic classification that changed according to one or more accessories coupled to the powered device. At act S103, the powered device sends a first current indicative of a first classification to the network device when no accessory is connected to the powered device.

After an accessory is connected to the powered device, at act S105, additional resistance is added to the powered device. The additional resistance may be located in a spine connector that couples the powered device to the accessory. The additional resistance may be located in the accessory. The additional resistance may be located in the powered device, in which case the accessory or the spine connector shorts or completes a circuit in the powered device that changes the resistance. The powered device may be forced to reset in response to the accessory being connected to the powered device. The accessory may initiate a reset signal by activating a physical or electronic switch in the powered device. For example, the accessory may trigger a relay based circuit in the powered device that forces a reset. Alternatively, the user may be prompted to reset the powered device. At act S107, the powered device sends a second current indicative of a second classification to the network device when at least one accessory is connected to the powered device.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

A computer-readable medium may include instructions for performing the acts of FIG. 11. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
   receiving, at a powered device, a classification voltage from a network device;
   sending a first current indicative of a first classification resistance to the network device when no accessories are connected to the powered device; and
   sending a second current indicative of a second classification resistance to the network device when at least one accessory is connected to the powered device, wherein the first classification resistance is not responsive to a second classification resistor and the second classification resistance is responsive to the second classification resistor, the second classification resistor being isolated from circuitry of the at least one accessory, wherein the at least one accessory is electrically coupled to the powered device through a classification path electrically connected to the second classification resistor and a functional path electrically connected to the circuitry of the at least one accessory and electrically isolated from the second classification resistor.

2. The method of claim 1, wherein the at least one accessory includes no switchable connection coupled to the second classification resistor.

3. The method of claim 1, wherein the first classification resistance is responsive to a first classification resistor, the powered device including the first classification resistor and the second classification resistor.

4. The method of claim 1, wherein the first classification resistance is responsive to a first classification resistor, the powered device including the first classification resistor and the at least one accessory including the second classification resistor.

5. The method of claim 1, wherein a spine connector configured to be coupled to the powered device includes the second classification resistor.

6. The method of claim 1, wherein the first current indicates power requirements for the powered device and the second current indicates power requirements for the powered device in combination with the at least one accessory.

7. The method of claim 1, wherein the powered device includes a voice over internet protocol (VoIP) telephone and the at least one accessory includes a key extension module.

8. The method of claim 1, further comprising:
engaging a resistor network in the powered device through a mechanical connection with the at least one accessory to electrically connect or shunt the second classification resistor.

9. The method of claim 1, further comprising:
receiving an interrogation voltage at the powered device from the network device; and
sending an interrogation signal from the powered device to the network device, wherein the interrogation signal triggers the classification voltage.

10. An apparatus comprising:
a classification circuit configured to receive a classification voltage from a network device and send a first current responsive to a first classification resistance to the network device when no accessories are connected to the apparatus; and an accessory connector configured to couple the apparatus to an accessory including a classification shunt, wherein the classification circuit is configured to send a second current responsive to a second classification resistance to the network device when at least the accessory and the classification shunt is connected to the apparatus, the second classification resistance responsive to a second classification resistor, wherein the second classification resistor is isolated from circuitry of the at least one accessory.

11. The apparatus of claim 10, wherein the second classification resistor is free of connections to power sources of the at least one accessory.

12. The apparatus of claim 10, wherein the apparatus further comprises the second classification resistor.

13. The apparatus of claim 10, wherein the at least one accessory comprises the second classification resistor.

14. The apparatus of claim 10, wherein a spine connector configured to electrically couple the apparatus to the at least one accessory comprises the second classification resistor.

15. The apparatus of claim 10, wherein the second classification resistance is responsive to the accessory and one or more additional accessories, each of the one or more additional accessories including a classification resistor in parallel to a first classification resistor of the apparatus.

16. An apparatus comprising:
a first connector configured to be electrically coupled to a powered device;
a second connector configured to be electrically coupled to an accessory including a classification shunt;
a data path from the first connector to the second connector, wherein the data path is configured to communicate data indicative of functions of the accessory to the powered device; and
a classification path from the first connector to the second connector and the classification shunt, wherein the classification path is electrically isolated from the data path.

17. The apparatus of claim 16, wherein the classification path includes a connection configured to lower a classification resistance of the powered device when the first connector is electrically coupled to the powered device.

18. The apparatus of claim 16, wherein the classification path includes an accessory classification resistance configured to lower a classification resistance of the powered device when the first connector is electrically coupled to the powered device.

\* \* \* \* \*